(12) United States Patent
Stangherlin et al.

(10) Patent No.: US 12,358,185 B2
(45) Date of Patent: Jul. 15, 2025

(54) WORKBENCH FOR SUPPORTING AND MOVING ARTICLES AND MACHINE FOR MACHINING AND CUTTING ARTICLES

(71) Applicant: BRETON S.P.A., Castello di Godego (IT)

(72) Inventors: Michele Stangherlin, Castello di Godego (IT); Renzo Codemo, Villa d'Asolo (IT); Claudio Saurin, Rubano (IT)

(73) Assignee: BRETON S.P.A., Castello di Godego (IT)

( * ) Notice: Subject to any disclaimer, the term of this patent is extended or adjusted under 35 U.S.C. 154(b) by 828 days.

(21) Appl. No.: 17/613,592

(22) PCT Filed: Jun. 19, 2020

(86) PCT No.: PCT/IB2020/055777
§ 371 (c)(1),
(2) Date: Nov. 23, 2021

(87) PCT Pub. No.: WO2020/261079
PCT Pub. Date: Dec. 30, 2020

(65) Prior Publication Data
US 2022/0234251 A1      Jul. 28, 2022

(30) Foreign Application Priority Data

Jun. 25, 2019   (IT) .................. 102019000010041

(51) Int. Cl.
*B28D 7/04*      (2006.01)
*A47B 9/10*      (2006.01)
(Continued)

(52) U.S. Cl.
CPC ............ *B28D 7/043* (2013.01); *B24B 41/068* (2013.01); *B25H 1/18* (2013.01); *B28D 1/04* (2013.01);
(Continued)

(58) Field of Classification Search
CPC .......... B28D 1/046; B28D 7/043; B28D 7/04; B25H 1/18; B25H 1/12; B24C 1/045;
(Continued)

(56) References Cited

U.S. PATENT DOCUMENTS 4,397,245 A      8/1983   Washburn
5,345,632 A *    9/1994   Langenaeken ....... A61B 6/0487
                                                    108/4

(Continued)

FOREIGN PATENT DOCUMENTS

| CN | 104118071 B | 8/2016 |
| EP | 1740359 B1 | 9/2007 |
| WO | 2014167470 A1 | 4/2014 |

OTHER PUBLICATIONS

PCT International Search Report and Written Opinion dated Sep. 18, 2020 for International Application No. PCT/IB2020/055777, from which the instant application is based, 11 pgs.

*Primary Examiner* — Makena S Markman
(74) *Attorney, Agent, or Firm* — Fredrikson & Byron, P.A.

(57) ABSTRACT

Workbench (1) for supporting and moving articles comprising a frame (22), a support surface (24) able to tilt relative to the frame (22) and pass from an initial horizontal position into a final inclined position, at least one rigid element (30) hinged with the frame (22) at a pivoting point (P) and having an end portion (36) hinged with the surface (24) and at least one first actuator (44) configured to raise and rotate the surface (24) into an intermediate inclined position. The element (30) is shaped as a rocker arm with the pivoting (Continued)

point (P) arranged between a first wing (32) and a second wing (34) and movement means (54) are provided for rotation of the rocker arm (30) about an axis (X2) so as to move the surface (24) from the intermediate position into the final inclined position. The first actuator (44) comprises a first end (46) hinged with the rocker arm (30) and a second end (48) hinged with the support surface (24).

16 Claims, 3 Drawing Sheets

(51) Int. Cl.
  *B24B 41/06* (2012.01)
  *B25H 1/18* (2006.01)
  *B28D 1/04* (2006.01)
  *B23D 47/02* (2006.01)
(52) U.S. Cl.
  CPC ......... *A47B 9/10* (2013.01); *A47B 2200/0043* (2013.01); *B23D 47/025* (2013.01)

(58) Field of Classification Search
  CPC ..... B24B 41/06; B24B 41/068; B23D 47/025; B23D 47/02; B23D 47/04; B24D 1/043; B24D 1/04; B24D 7/04; A47B 13/003; A47B 13/081; A47B 13/00; A47B 2200/043
  See application file for complete search history.

(56) References Cited

U.S. PATENT DOCUMENTS

| | | | |
|---|---|---|---|
| 5,601,014 A * | 2/1997 | Stevens | B66F 7/08 108/9 |
| 2013/0239942 A1* | 9/2013 | Guazzoni | B28D 7/04 125/35 |
| 2016/0207223 A1* | 7/2016 | Schlough | B28D 7/02 |

* cited by examiner

WORKBENCH FOR SUPPORTING AND MOVING ARTICLES AND MACHINE FOR MACHINING AND CUTTING ARTICLES

RELATED APPLICATIONS

This application is a 35 U.S.C. 371 national stage filing from International Application No. PCT/IB2020/055777, filed Jun. 19, 2020, which claims priority to Italian Application No. 102019000010041, filed Jun. 25, 2019, the teachings of which are incorporated herein by reference.

The present invention relates to a workbench for supporting and moving articles made of stone, glass, ceramic or metallic material during a machining process.

Furthermore, the present invention relates also to a machine for cutting and machining the articles, comprising the aforementioned supporting and movement workbench.

The workbench may be used in combination with machines for cutting sheet-like articles by means of a water jet, which normally contains granules of abrasive material, if necessary in combination with a cutting tool, for example a cutting disc.

Generally, these machines comprise a workbench for supporting the articles, a unit for machining the articles and means for moving the machining unit above the supporting workbench. For example, the machining unit may comprise water jet cutting means comprising a nozzle, if necessary in combination with disc cutting means.

The movement means of the machining unit may comprise two lateral structures and a beam positioned above and transversely with respect to the lateral structures and supported by the same at its ends. The beam is able to slide along the lateral support structures.

The movement means may also comprise a carriage mounted slidably on the beam and a sleeve mounted on the carriage and able to move vertically relative thereto. A head or fork member, on which the cutting means are mounted, is connected to the bottom end of the sleeve.

Alternatively, the movement means may also be different from those indicated above and may comprise, for example, an anthropomorphic robot.

In the case where the machining unit comprises water jet cutting means, the supporting workbench comprises a tank which is normally filled with water and on top of which an interchangeable metal grille is placed.

The water tank has the function not only of recovering the water containing the abrasive material used during the cutting process, but also of cushioning the violent impact of the water jet emitted from the nozzle and passing through the article.

When the machining unit also comprises a disc cutting tool, a sacrificial surface may be positioned on the grille so as to take up the incisions by the disc cutting tool and avoid the impact of the disc with the metal grille, which would otherwise damage the grille itself.

For example, the documents EP1740359 and WO2014167470 describe machines for machining articles of the type described above.

One drawback of these solutions is that the workbench for supporting the articles is fixed, namely it may not be tilted and/or inclined with respect to the horizontal.

Therefore, the positioning and removal of the articles onto and from the workbench by an operator, even if suitable instruments and auxiliary devices such as a jib crane equipped with grippers or suction means are used, are particularly difficult and complex to perform, resulting also in an increase in the overall machining time.

In order to overcome at least partially said drawback, supporting workbenches have been developed with a support surface which is able to be tilted relative to a fixed frame and on which the article to be machined is positioned.

In particular, the support surface is movable between a horizontal position and an inclined or tilted, nearly vertical, position, with an edge close to the ground. The movement of the surface is performed by means of suitable movement means.

The surface is kept in the horizontal position when it is required to proceed with cutting or machining of the article and is arranged in the inclined position when the operator must load the article onto the surface or unload the cut or machined parts from the surface.

US20160207223 discloses a tilting workbench of the type indicated above, comprising a pair of movement mechanisms located on opposite sides with respect to the surface and each having a pair of hinged rigid elements, or connecting rods, and a hydraulic actuator. The frame, the surface and the connecting rods form a hinged quadrilateral.

Each of the rigid elements is hinged at one end with the fixed frame of the workbench and at the other end with the tilting surface; the actuator is hinged at one end with the fixed frame and the free end of the piston of the actuator is hinged with one of the two rigid elements.

Inclination of the support surface from the horizontal position into the inclined position is performed by activating the actuator which operates the rigid element to which it is connected so as to perform a rotary translational movement of the surface. Therefore, the rigid elements allow the rotary translational movement of the surface initially performed by the activation of the actuator.

U.S. Pat. No. 4,397,245 discloses a titling workbench similar to that described above and comprising a first and a second actuator for moving the surface from the horizontal position into the inclined position.

In particular, the first actuator is hinged with the fixed frame, while the end of the piston of the actuator is hinged with the support surface so as to raise it relative to the frame after being activated.

Also envisaged is a pair of rigid bars hinged together at one end, while the other two ends are hinged, respectively, with the support surface and the frame. These bars are moved by a second actuator arranged between one of the rigid bars and the frame.

When the support surface is in the horizontal position, the bars are superimposed on each other for displacement of the support surface into the inclined position and the second actuator is activated so as to raise the bars and align them along a diagonal so that they act as a support for the inclined surface.

One drawback of these solutions consists in the fact that the trajectory of the support surface from the horizontal position into the inclined position, and vice versa, is predefined and may not be modified.

Another drawback consists in the fact that it is not possible to adjust the movement trajectory of the surface depending on the free dimensions of the machine in which the supporting workbench is installed.

A further drawback consists in the fact that these supporting workbenches do not allow adjustment of the displacement trajectory of the titling surface depending on the type of article to be loaded onto the support surface.

These drawbacks do not allow the operator to choose an optimum trajectory for maneuvering the support surface and therefore loading the articles and unloading the cut or machined parts in an easy manner. Moreover, these drawbacks result in an increase in the overall machining time.

A further drawback of the solutions indicated above consists in the fact that the operator is unable to programme displacement trajectories of the surface which are predefined and different from each other depending on the operating requirements.

The main object of the present invention is to provide a workbench for supporting and moving articles and a machine for cutting and machining the articles which are able to overcome the aforementioned drawbacks.

A particular task of the present invention is to provide a supporting and movement workbench which allows its displacement trajectory to be adjusted depending on the operating conditions.

A further task of the present invention is to provide a supporting and movement workbench which allows its displacement trajectory to be adjusted depending on the dimensions of the machine in which it is installed.

Another task of the present invention is to provide a supporting and movement workbench which simplifies the operations for loading and unloading the articles and provides a stable support for them during machining.

A further task of the present invention is to provide a supporting and movement workbench which is able to reduce the overall movement time and therefore machining time.

Another task of the present invention is to provide a supporting and movement workbench which allows the programming of different movement trajectories of the tilting surface depending on the operating requirements.

The object and the main tasks described above are achieved with a workbench for supporting and moving articles and its method of operation according to claims 1 and 16, respectively, and with a machine for cutting and machining articles comprising the aforementioned supporting workbench according to claim 15.

In order to illustrate more clearly the innovative principles of the present invention and its advantages compared to the prior art, non-limiting examples of embodiment will be described below with the aid of the accompanying drawings. In the drawings.

Figure 1:
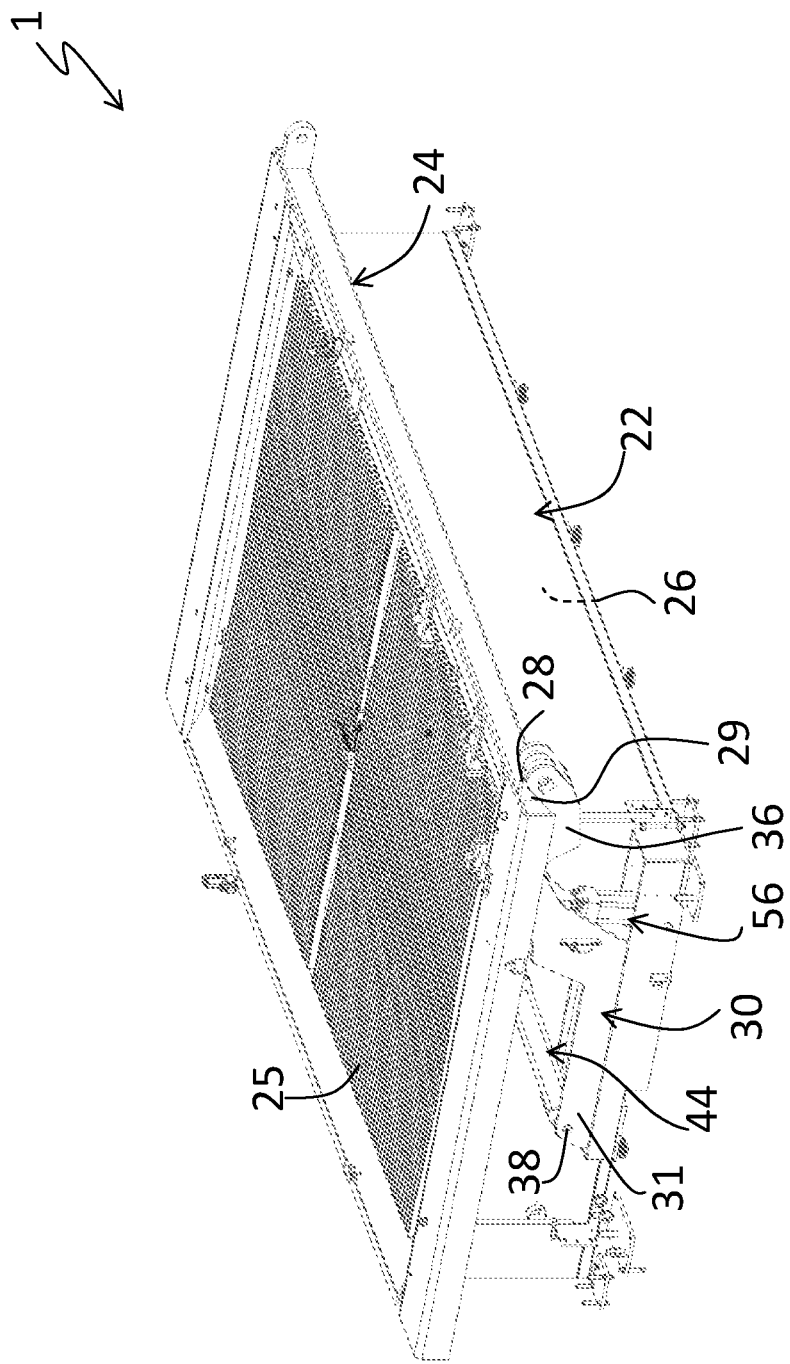
FIG. 1 shows a perspective view of the workbench for supporting and moving articles according to the present invention.
Figure 3A:
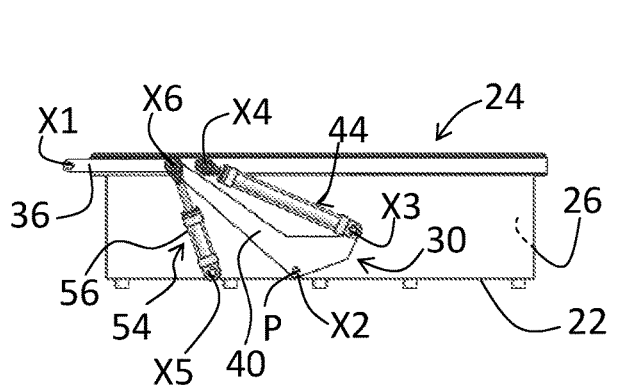
Figure 3B:
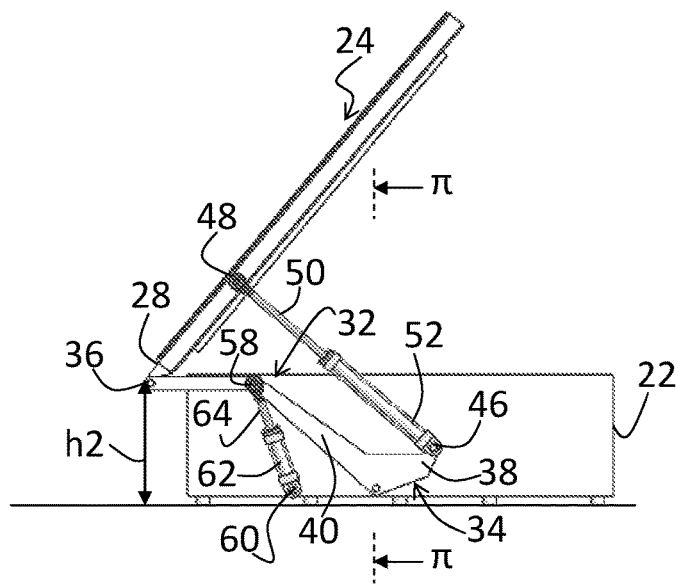
Figure 3C:
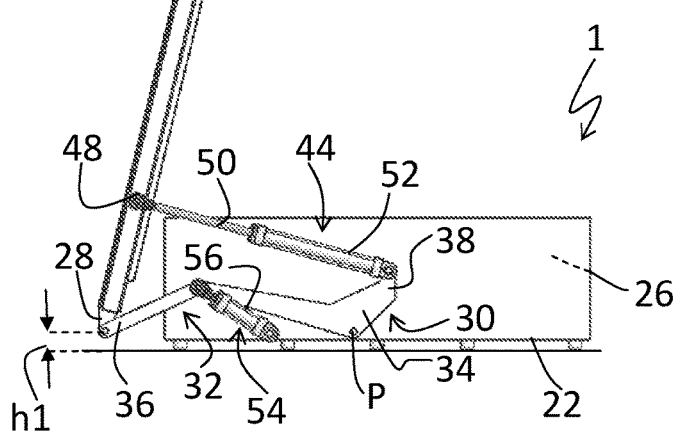

FIGS. 3*a*-3*c* shows schematic side views of the supporting and movement workbench according to FIG. 1 during operation.

With reference to the figures, a workbench is shown for supporting and moving articles during a machining process, denoted overall by the reference number 1.

Preferably, the articles are made of stone, glass, ceramic or metallic material. However, the articles may also be made using different materials without thereby departing from the scope of protection of the present invention. Moreover, the articles preferably have a sheet-like form.

Figure 2:
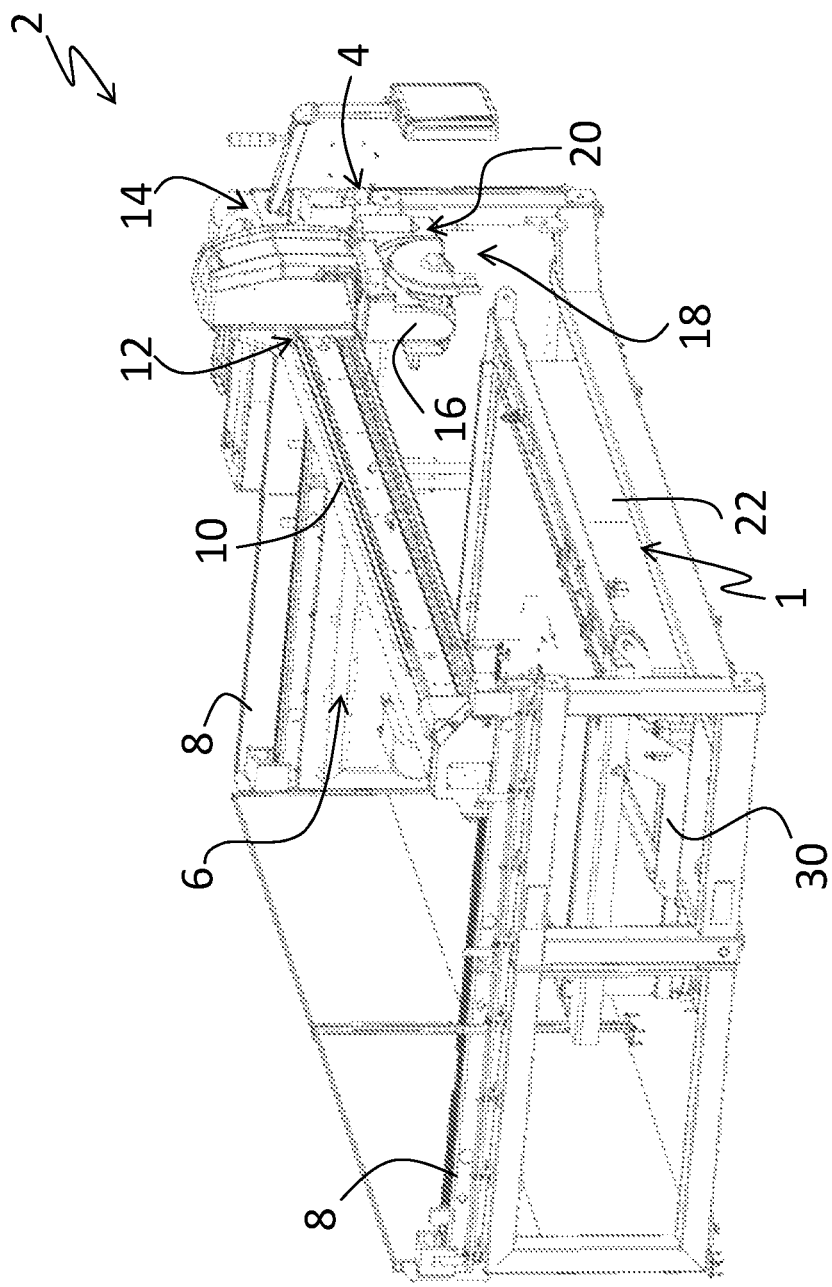
FIG. 2 shows a perspective view of a machine for cutting and machining articles according to the present invention and comprising the supporting and movement workbench according to FIG. 1.

Preferably, the supporting and movement workbench 1 is designed to be mounted in a cutting and machining machine 2, in particular a cutting machine with interpolated axes, of the type shown in FIG. 2.

However, the supporting and movement workbench 1 may also be used independently in a plant or line for machining articles or may be mounted in a machine different from that indicated above, without thereby departing from the scope of protection of the present invention.

In a manner known per se, the machine 2 comprises, in addition to the supporting and movement workbench 1, a unit 4 for cutting and/or machining the articles and means 6 for moving the cutting and/or machining unit 4 above the supporting and movement workbench 1, as shown in FIG. 2.

Conveniently, the movement means 6 of the cutting and/or machining unit 4 comprise two lateral support structures or shoulders 8 and a beam 10 positioned above the lateral structures 8 and slidably supported by the same at its ends. The beam 10 is therefore able to slide along the lateral support structures 8.

The lateral support structures 8 and the remaining part of the structure of the machine 2 define a working area inside which the supporting workbench 1 is positioned.

The movement means 6 comprise a carriage 12 mounted slidably on the beam 10 and a sleeve 14 mounted on the carriage 12 and slidable relative thereto along a vertical direction.

The cutting and machining unit 4 is mounted on the bottom end of the sleeve 14 and may comprise a head or fork member 16 rotatable with respect to the sleeve 14 and able to be moved away or towards the support surface of the workbench 1.

In the embodiment shown, the cutting and/or machining unit comprises disc cutting means 18 and water jet cutting means 20 mounted on the head or fork 16. The water jet preferably contains in a manner known per se an abrasive material.

Conveniently, the disc cutting means 18 comprise a motorized spindle or electro-spindle supported by the head or fork member 16 for rotation of the disc, while the abrasive water jet cutting means 20 comprise a nozzle.

Obviously, the machining unit 4 may also comprise only the disc cutting means 18 or only the abrasive water jet cutting means 20.

In a preferred embodiment of the invention, shown more clearly in FIGS. 1 and 3*a*-3*c*, the supporting and movement workbench 1 comprises a fixed frame or base 22 in contact with the ground and a surface 24 for supporting the articles.

The support surface 24 is able to be tilted with respect to the frame 22 and moved from an initial horizontal position parallel to the ground, shown in FIG. 3*a*, into a final position inclined with respect to the horizontal, close to the vertical, shown in FIG. 3*c*, and vice versa.

The movement of the support surface 24 from the initial horizontal position into the final inclined position is performed preferably by means of rotary translation of the surface 24.

The terms "initial" and "final" are used in the context of the present description only as reference terms; it is quite possible for the inclined position to correspond to the initial position during the rotary translational movement of the support surface 24 and for the horizontal position to correspond to the final position during the rotary translational movement of the support surface 24.

The support surface 24 defines a leaning surface for the article; the cutting or machining of the articles by the cutting and machining unit 4 is performed when the support surface 24 is in the horizontal position.

Advantageously, unloading of the cut parts of the article, in particular when they have small dimensions, may be performed when the support surface 24 is in the initial horizontal position; when the support surface 24 is in the inclined, nearly vertical, final position, both loading of the articles and unloading of the cut or machined parts of the article may be performed.

Conveniently and preferably, the frame 22 delimits laterally a tank 26 designed to contain water and having an upper opening. The tank 26 is intended to be used for recovery of the water with the abrasive material used during cutting of the articles by means of a water jet and also for cushioning the violent impact of the water jet emitted from the nozzle and passing through the material of the article.

When the support surface 24 is in the working position, it is arranged horizontally and lies on top of the upper opening of the tank 26 (see FIG. 3a) which is therefore closed by the support surface 24; the support surface 24 is instead in the loading/unloading position when it has a predetermined inclination with respect to the ground, close to the vertical position (see FIG. 3c).

In this position, an edge 28 of the surface 24 is located close to the ground at a predetermined height h1 from the ground and external to the perimeter of the frame 22 (see FIG. 3c).

Advantageously, the support surface 24 may be formed by a metal grille 25 (see FIG. 1) and by a possible sacrificial surface. The sacrificial surface may consist of a wooden board or elements made of plastic material or rubber which are inserted straddling the profiles which form the grille. The sacrificial surface protects the metal grille against incisions by the disc cutting means.

Conveniently, the tilting surface 24 could optionally also comprise means, not shown in the figures, for provisionally locking the article in position, so as to prevent the cut and/or machined parts of the article from falling or being displaced during the movement of the support surface 24. The locking means are of a type known per se and therefore will not be further described below.

The workbench 1 also comprises a rigid element 30, shaped in the manner of a rocker arm and hinged with the frame 22, in particular with the base of the frame 22, at a pivoting point P. Preferably, the pivoting point P is located in the vicinity of the middle point of the frame 22, as shown in FIGS. 3a-3c. In the continuation of the present description, the rigid element will be identified as rocker arm 30 and therefore these two terms identify the same element.

The rocker arm 30 has a non-linear profile, preferably a broken-line profile, and comprises a first wing 32 and a second wing 34 located on opposite sides with respect to a vertical plane π passing through the pivoting point P, as shown in FIG. 3b. Therefore, the pivoting point P is located between the first wing 32 and the second wing 34.

The first wing 32 comprises an end portion 36 and an intermediate portion 40 arranged between the pivoting point P and the end portion 36.

The end portion 36 of the first wing 32 is hinged directly on the support surface 24 at a predetermined hinging point and about an axis of rotation X1.

Instead, the second wing 34 comprises an end portion 38 hinged indirectly with the support surface 24 via a first actuator 44 described in detail in the continuation of the description.

The hinging point of the end portion 36 of the first wing 32 of the rocker arm 30 with the support surface 24 is positioned on or close to an edge of the tilting surface 24, namely the edge 28 which is moved close to the ground when the surface 24 is in the final inclined position.

As shown in the embodiment of FIG. 1, the end portion 36 of the first wing 32 of the rocker arm 30 may have a profile bent relative to the intermediate portion 40 and the edge 28 of the surface 24 may have a flange 29 with a hole for hinging the end 36.

The hinged condition of the edge 28 of the support surface 24 with the end portion 36 of the first wing 32 of the rocker arm 30 allows the relative rotation of the surface 24 and the end portion 36 about the horizontal axis of rotation X1 passing through the hinging point during the rotary translational movement of the surface 24.

The means for hinging the rocker arm 30 with the support surface 24, such as those described below, are of the type known per se and therefore will not be further described.

The connection zone between the intermediate portion 40 of the first wing 32 and the second wing 34 has a convex shape with its convexity directed towards the base of the frame 22, so as to allow the rotation of the rocker arm 30 about a horizontal axis X2 passing through the pivoting point P.

Alternatively, according to an embodiment not shown in the figures, the shape of the intermediate portion 40 of the first wing 32 and the second wing 34 could also have a configuration different from that shown, provided that it maintains its convexity.

Advantageously, as shown in FIG. 1, the rocker arm 30 may be formed by a pair of similar shaped brackets 31 designed to be arranged alongside each other and joined together so as to form a housing interspace, the function of which will be explained below.

As already mentioned above, there is also provided at least one first actuator 44 having a first end 46 hinged with the rocker arm 30 and more precisely with the second wing 34 and a second end 48 hinged with the support surface 24, as shown more clearly in FIGS. 3b and 3c.

It should be noted that the second end 48 of the first actuator 44 is hinged with the support surface 24 in a position remote from the edge 28 hinged with the end portion 36 of the first wing 32 of the rocker arm 30 and precisely in the central zone of the surface 24, as shown in FIGS. 3b and 3c.

Furthermore, the first end 46 of the first actuator 44 is hinged with the rocker arm 30 at or close to the end portion 38 of the second wing 34.

Advantageously, the first actuator 44 is configured and positioned to raise the support surface 24 with respect to the frame 22 into a predefined, intermediate. inclined position, shown in FIG. 3b.

In the intermediate position, the support surface 24 has an inclination relative to the horizontal smaller than the predetermined inclination of the support surface 24 in the inclined final position for loading/unloading indicated above and shown in FIG. 3c.

Moreover, in the intermediate inclined position, the edge 28 of the support surface 24 on which the end portion 36 of the first wing 32 of the rocker arm 30 is hinged is located at a height h2 greater than the height h1 of the edge 28 in the final loading/unloading position and its vertical projection is situated external to the perimeter of the frame 22, as shown in FIGS. 3b and 3c.

It is pointed out that the intermediate inclined position is not a unique position, but may identify a series of positions between the horizontal initial position and the final inclined position for loading/unloading, provided that these positions satisfy the conditions indicated above.

Advantageously, the first actuator 44 comprises a cylinder 52 and a piston 50 slidable along the axis of the cylinder 52; preferably, the piston 50, in particular its free end 48, is hinged with the support surface 24 and the cylinder 52 is hinged with the rocker arm 30 at its end 46, as shown in FIG. 3b.

In particular, the cylinder 52 of the first actuator 44 may be hinged with the rocker arm 30 at a hinging point situated between the end portion 38 of the second wing 34 of the rocker arm 30 and the pivoting point P. Advantageously, the cylinder 52 of the first actuator 44 is hinged on the end portion 38 of the second wing 34.

Therefore, the cylinder 52 of the first actuator 44 is rotatable with respect to the second wing 34 of the rocker arm 30 about a horizontal axis X3 located above the axis of rotation X2.

In fact, the movement of the support surface 24 from the initial horizontal position into the intermediate inclined position is obtained by means of extraction of the piston 50 of the first actuator 44 from a retracted position into an extended position and rotation of the cylinder 52 of the first actuator 44 about the end portion 38 of the second wing 34 of the rocker arm 30.

Moreover, during the movement of the support surface 24 from the horizontal position into the intermediate position the end of the piston 50 rotates about a respective horizontal axis X4 passing through the hinging point of the piston 50 with the support surface 24.

In accordance with the present invention, the workbench 1 comprises movement means 54 for rotating the rocker arm 30 about the horizontal axis X2 passing through the pivoting point P so as to move the surface 24 from the intermediate inclined position into the final inclined position, and vice versa.

Both the first actuator 44 and the movement means 54 for rotating the rocker arm 30 are connected to a control unit for selectively operating them.

In particular, the movement means 54 may be activated and adjusted selectively also during the movement of the support surface 24 from the horizontal position into the intermediate position performed by the first actuator 44; moreover, the first actuator 44 may be also be activated and adjusted selectively during the movement of the support surface 24 from the intermediate inclined position into the final inclined position for loading/unloading performed by the movement means 54.

With this configuration it is possible to control in a precise and variable manner the movement trajectory of the support surface 24 from the initial horizontal position into the final inclined position, and vice versa, and to program the predefined displacement trajectories of the support surface 24.

In a preferred embodiment, the movement means 54 comprise at least one second actuator 56 having a first end 58 hinged with the rocker arm 30 and a second end 60 hinged with the frame 22, as shown more clearly in FIG. 3b.

Obviously, the second actuator 56 is connected to the control unit like the first actuator 44 so that its mode of operation is similar to that described above.

Conveniently, the second actuator 56 may be hinged with the rocker arm 30 on the first wing 32, in particular on the intermediate portion 40, even more preferably along the connection zone between the intermediate portion 40 and the end portion 36 described above, as can be clearly seen in FIG. 3b.

Advantageously, as mentioned above, the intermediate portion 40 and the end portion 36 of the first wing 32 define a broken-line profile with its concavity directed towards the base of the frame 22 in the region of the connection zone, so as to allow the housing and the rotation of the second actuator 56.

Furthermore, the second actuator 56 is hinged with the frame 22 at a different point remote from the pivoting point P, but positioned in any case along the base of the frame 22.

In a similar manner to that described for the first actuator 44, the second actuator 56 comprises a cylinder 62 hinged with the fixed frame 22 and a piston 64 slidable along the axis of the cylinder.

As shown in FIG. 3b, the piston 64 comprises the end 58 hinged with the rocker arm 30, in particular in the interconnection zone between the intermediate portion 40 and the end portion 36.

As shown in FIG. 1, the ends 46 and 58 of the actuators 44 and 56 are hinged with both the brackets 31 of the rocker arm 30 indicated above and are positioned in the interspace between the brackets 31.

Furthermore, the first actuator 44 and the second actuator 56 may be both of the pneumatic or hydraulic type.

Advantageously, the rotation of the rocker arm 30, in particular the rotation of the first wing 32 with the end portion 36 downwards, so as to allow the movement of the support surface 24 from the intermediate inclined position into the final inclined position for loading/unloading, is performed by retracting the piston 64 of the second actuator 56 and rotating the cylinder 62 of the second actuator 56 about the horizontal axis X5 passing through the hinging point of the cylinder 62 on the fixed frame 22, as shown in FIG. 3b.

Furthermore, during the movement of the support surface 24 from the intermediate inclined position into the final inclined position, the end 58 of the piston 64 rotates relative to the rocker arm 30 about a respective horizontal axis X6. For the sake of easier illustration, all the reference symbols/numerals relating to the axes of rotation have been shown in FIG. 3a.

Instead, the rotation upwards of the rocker arm 30 so as to position the surface 24 in the intermediate inclined position is performed by means of rotation of the second actuator 56 in the opposite direction to that described above and by means of sliding of the piston 64 from the retracted position shown in FIG. 3c into the extended position shown in FIG. 3b.

It can be seen that the movement of the support surface 24 from the intermediate inclined position into the final inclined position is not hindered by the fixed frame 22 since, during the first movement phase, performed with the first actuator 44, the surface 24 is positioned with its edge 28 external to the volume of the fixed frame 22.

If this feature were not present, the edge of the surface 24 would strike against the edge of the frame 22 during the movement of the surface 24 from the intermediate inclined position into the final inclined position.

In an alternative embodiment not shown in the figures, the movement means could also comprise a second actuator comprising a cylinder hinged on the top part of the frame, instead of on the bottom part, and a piston with an end hinged with the first wing of the rocker arm.

In this alternative embodiment, the second actuator would be designed to push the rocker arm downwards so as to cause the downwards rotation of the rocker arm by means of extraction of the piston.

Furthermore, considering the rocker arm 30, the first actuator 44 and the second actuator 56 described above as a unit for moving the surface 24, the workbench 1 may have two movement units located on two opposite sides of the surface 24. This embodiment is not shown in the figures.

In accordance with alternative embodiments of the invention not shown in the figures, the actuators could also be different from those described above and could comprise, for example, gearmotors axially aligned on pins or racks with a swing bar.

The present invention also relates to a method of operation of the supporting and movement workbench 1 described above, which comprises the following steps:

a) arranging the workbench 1 with the support surface 24 in an initial horizontal position; in this position the piston 50 of the first actuator 44 is in the retracted position relative to its cylinder 52 while the piston 64 of the second actuator 56 is in an extended position relative to its cylinder 62;

b) activating the first actuator 44 by extracting the piston 50 and rotating the cylinder 52 about the end portion 38 of the second wing 34 of the rocker arm 30 so as to position the support surface 24 in the intermediate inclined position described above and shown in FIG. 3*b*;

c) activating the second actuator 56 by sliding the piston 64 so as to bring it into the retracted position and rotating the cylinder 62 about the axis X5 passing through the hinging point on the fixed frame 22 so as to rotate the rocker arm 30 about the pivoting point P and position the support surface 24 in the final inclined position for loading/unloading shown in FIG. 3*c*.

As mentioned above, during the steps b) and c), the ends 48, 58, respectively, of the pistons 50, 64 rotate respectively relative to the support surface 24 and the rocker arm 30 about the respective hinging points.

Obviously, the method also involves a second phase, namely that during which the support surface 24 performs the opposite movement, namely from the final inclined position into the intermediate inclined position and from the latter into the initial horizontal position, carrying out in the reverse order the steps indicated above.

The method differs from the prior art in that it envisages a control unit connected to the actuators and configured to control the selective activation of the first actuator 44 and, where necessary, of the second actuator 56 during the movement of the support surface 24 from the initial horizontal position into the intermediate inclined position, and the activation of the second actuator 56 and, if necessary, of the first actuator 44 during the movement of the support surface 24 from the intermediate inclined position into the final inclined position for loading/unloading.

Therefore, the actuators 44, 56 may be activated both sequentially and simultaneously, depending on the operating requirements, or at different or the same speeds.

In this way, the operator has the possibility of controlling and adjusting continuously the displacement trajectory of the support surface from the horizontal position into the final inclined position for loading/unloading.

From the above description, it is now clear how the supporting and movement workbench and the machining and cutting machine according to the present invention are advantageously able to achieve the predefined objects.

In particular, since the workbench comprises at least one first actuator and one second actuator connected to the control unit, the operator has the possibility of adjusting at any time the displacement trajectory of the support surface by operating the actuators.

The operator may also program predefined displacement trajectories of the surface which are different from each other depending on the operating conditions to be adopted or the type of article to be machined.

Therefore, the supporting workbench according to the present invention helps to simplify and speed up the operations of loading/unloading the articles and reduce the overall machining times.

Obviously, the above description of the embodiments applying the innovative principles of the present invention is provided by way of example of these innovative principles and must therefore not be regarded as limiting the scope of the rights claimed herein.

For example it is also possible to envisage different types of components or different forms and configurations of the elements, such as the form or configuration of the shaped rigid element or rocker arm.

The invention claimed is:

1. A workbench for supporting and moving articles made of stone, glass, ceramic or metallic material, comprising:
   a fixed frame;
   a support surface for the article, said support surface being able to be tilted relative to the frame and to be moved from an initial horizontal position which is parallel to ground to a final position inclined relative to the initial horizontal position for loading and unloading the article, and vice versa;
   at least one rigid element hinged with the frame at a pivoting point and having an end portion hinged with the support surface;
   at least one first actuator configured and positioned for raising and rotating said support surface relative to said frame into a predefined intermediate inclined position;
   characterized in that said rigid element is shaped as a rocker arm with the pivoting point positioned between a first wing and a second wing of said rocker arm, in that the workbench comprises movement means for rotating the rocker arm about an axis passing through said pivoting point so as to move said support surface from said intermediate inclined position into said final inclined position for loading/unloading, and vice versa, and in that said first actuator comprises a first end hinged with the rocker arm and a second end hinged with the support surface.

2. The workbench according to claim 1, characterized in that said movement means comprises at least one second actuator having a first end hinged with said rocker arm and a second end hinged with said fixed frame.

3. The workbench according to claim 2, characterized in that said second actuator is hinged with said rocker arm at an intermediate portion between said end portion and said pivoting point.

4. The workbench according to claim 2, characterized in that said second actuator comprises a cylinder and a piston slidable along the axis of said cylinder, said cylinder being hinged with said fixed frame and said piston being hinged with said rocker arm.

5. The workbench according to claim 4, characterized in that downward rotation of said rocker arm for moving said support surface from said intermediate inclined position into said final inclined position is brought about by retracting the piston of said second actuator and by rotating the cylinder of said second actuator about a horizontal axis passing through the hinging point of the cylinder on the fixed frame.

6. The workbench according to claim 1, characterized in that said first actuator comprises a piston and a cylinder, said piston being hinged with said support surface and said cylinder being hinged with said rocker arm.

7. The workbench according to claim 6, characterized in that the cylinder of said first actuator is hinged with said rocker arm on said end portion.

8. The workbench according to claim 6, characterized in that the movement of said support surface from said initial horizontal position into said intermediate inclined position is obtained by extension of the piston of said first actuator and rotation of the cylinder of said first actuator about an axis passing through the hinging point of the cylinder on the rocker arm.

9. The workbench according to claim 1, characterized in that said end portion of said rocker arm is hinged with said support surface at a hinging point positioned on an edge of said support surface.

10. The workbench according to claim 9, characterized in that a vertical projection of the edge of said support surface is external to the perimeter of said frame when said support surface is in said intermediate inclined position.

11. The workbench according to claim 1, characterized in that in said intermediate inclined position said support surface has an inclination relative to the initial horizontal position smaller than the inclination of said support surface in said final inclined position for loading/unloading.

12. The workbench according to claim 1, characterized in that said fixed frame, for cutting by means of a water jet, comprises a tank containing a liquid, wherein the liquid contains one or more of abrasive granules and a sacrificial surface for cutting by means of a disc tool.

13. The workbench according to claim 12, characterized in that said tank is delimited on its sides by said frame and has an upper opening designed to be closed by said support surface when the support surface is in the initial horizontal position.

14. The workbench according to claim 1, characterized in that said first actuator and said movement means of the support surface are connected to a control unit for selective activation thereof.

15. A method of operation of the workbench for supporting and moving articles made of stone, glass, ceramic or metallic material according to claim 2 comprising the following steps:

a) arranging said support surface in the initial horizontal position, with a piston of said first actuator in a retracted position relative to a cylinder of said first actuator and with a piston of said second actuator in an extended position relative to a cylinder of said second actuator;

b) activating said first actuator by extending the piston of the first actuator and rotating the cylinder of the first actuator about said end portion of said rocker arm so as to position said support surface in said intermediate inclined position;

c) activating said second actuator by retracting the piston of the second actuator and rotating the cylinder of the second actuator about its hinging point on the fixed frame so as to rotate said rocker arm about said pivoting point and position said support surface in said final inclined position for loading/unloading;

characterized in that said first actuator and said second actuator are connected to a control unit configured to control the selective activation of at least the first actuator during the movement of the support surface from the initial horizontal position to the intermediate inclined position, and the selective activation of at least the second actuator during the movement of the support surface from the intermediate inclined position into the final inclined position for loading/unloading.

16. A machine for cutting and machining articles made of stone, glass, ceramic or metallic material, comprising:
 a unit for cutting and/or machining the articles;
 the workbench according to claim 1 for supporting and moving the articles; and
 movement means for moving said cutting and/or machining unit above said workbench.

\* \* \* \* \*